US012809772B2

(12) United States Patent
Gupta et al.

(10) Patent No.: US 12,809,772 B2
(45) Date of Patent: Nov. 24, 2026

(54) CACHING OF DATA USING A NEXT READ INDEX TO SAVE POWER AND IMPROVE PERFORMANCE

(71) Applicant: QUALCOMM Incorporated, San Diego, CA (US)

(72) Inventors: Hitesh Kumar Gupta, Sunnyvale, CA (US); Eric Wayne Mahurin, Austin, TX (US); Chao Chen, Farmers Branch, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/677,104

(22) Filed: May 29, 2024

(65) Prior Publication Data

US 2025/0370928 A1 Dec. 4, 2025

(51) Int. Cl.
*G06F 12/08* (2016.01)
*G06F 12/0802* (2016.01)

(52) U.S. Cl.
CPC ................................ *G06F 12/0802* (2013.01)

(58) Field of Classification Search
CPC ............. G06F 12/0802; G06F 12/0846; G06F 12/0853; G06F 12/0877; G06F 12/0875; G06N 3/063
USPC .......................................................... 711/118
See application file for complete search history.

(56) References Cited

U.S. PATENT DOCUMENTS

| | | | | |
|---|---|---|---|---|
| 7,290,116 | B1 * | 10/2007 | Grohoski | G06F 12/0864 711/E12.024 |
| 2003/0074537 | A1 | 4/2003 | Pang et al. | |
| 2004/0073749 | A1 * | 4/2004 | Parthasarathy | G06F 12/0864 712/E9.058 |
| 2010/0017556 | A1 * | 1/2010 | Chin | G06F 12/0246 711/E12.001 |
| 2015/0358417 | A1 * | 12/2015 | Patil | G06F 9/45533 709/219 |
| 2016/0350220 | A1 * | 12/2016 | Salisbury | G06F 12/0817 |
| 2021/0406686 | A1 | 12/2021 | Xiao et al. | |
| 2022/0067524 | A1 | 3/2022 | Mathaikutty et al. | |
| 2022/0156185 | A1 * | 5/2022 | Colella | G06F 12/0223 |
| 2022/0342811 | A1 * | 10/2022 | Yang | G06F 12/0882 |
| 2023/0169319 | A1 | 6/2023 | Pillai et al. | |
| 2023/0229312 | A1 * | 7/2023 | Hong | G06F 3/061 711/154 |
| 2024/0070107 | A1 * | 2/2024 | Yudanov | G06F 13/32 |
| 2024/0303204 | A1 * | 9/2024 | Salamat | G06F 12/128 |

OTHER PUBLICATIONS

International Search Report and Written Opinion—PCT/US2025/023870—ISA/EPO—Jul. 29, 2025.

* cited by examiner

*Primary Examiner* — Than Nguyen
(74) *Attorney, Agent, or Firm* — Patterson + Sheridan LLP

(57) ABSTRACT

Certain aspects of the present disclosure generally relate to electronic circuits and, more particularly, to techniques for memory access. Certain aspects provide a method for memory access. The method generally includes identifying whether data to be accessed is stored in a data cache coupled to a memory, storing an index associated with a line in the data cache in a next read index storage element based on the identification, and processing the data from the data cache based on the index.

20 Claims, 4 Drawing Sheets

CACHING OF DATA USING A NEXT READ INDEX TO SAVE POWER AND IMPROVE PERFORMANCE

TECHNICAL FIELD

Certain aspects of the present disclosure generally relate to electronic circuits and, more particularly, to techniques for memory access.

BACKGROUND

An artificial neural network, which may be composed of an interconnected group of artificial neurons (e.g., neuron models), is a computational device or represents a method performed by a computational device. These neural networks may be used for various applications and/or devices, such as Internet Protocol (IP) cameras, Internet of Things (IoT) devices, autonomous vehicles, and/or service robots.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

In layered neural network architectures, the output of a first layer of neurons becomes an input to a second layer of neurons, the output of a second layer of neurons becomes an input to a third layer of neurons, and so on. Convolutional neural networks may be trained to recognize a hierarchy of features. Computation in convolutional neural network architectures may be distributed over a population of processing nodes, which may be configured in one or more computational chains. These multi-layered architectures may be trained one layer at a time and may be fine-tuned using back propagation.

SUMMARY

The systems, methods, and devices of the disclosure each have several aspects, no single one of which is solely responsible for its desirable attributes. Without limiting the scope of this disclosure as expressed by the claims that follow, some features will now be discussed briefly. After considering this discussion, and particularly after reading the section entitled "Detailed Description," one will understand how the features of this disclosure provide the advantages described herein.

Certain aspects of the present disclosure are directed towards a method for memory access. The method generally includes: identifying whether data to be accessed is stored in a data cache coupled to a memory; storing an index associated with a line in the data cache in a next read index storage element based on the identification; and reading and/or processing the data from the data cache based on the index.

Certain aspects of the present disclosure are directed towards an apparatus for memory access. The apparatus generally includes: a memory; a memory read controller configured to identify whether data to be accessed is stored in a data cache coupled to the memory; a next read index storage element configured to store an index associated with a line in the data cache in a next read index storage element based on the identification; and processing circuitry configured to process the data from the data cache based on the index.

Certain aspects of the present disclosure are directed towards a neural processing unit. The neural processing unit generally includes: a memory; a memory read controller configured to identify whether weight data to be accessed is stored in a weight data cache coupled to the memory; a next read index first-in-first-out (FIFO) storage element configured to store an index associated with a line in the data cache in a next read index storage element based on the identification; and a multiplier circuit configured to multiply activation data and the weight data from the data cache based on the index.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
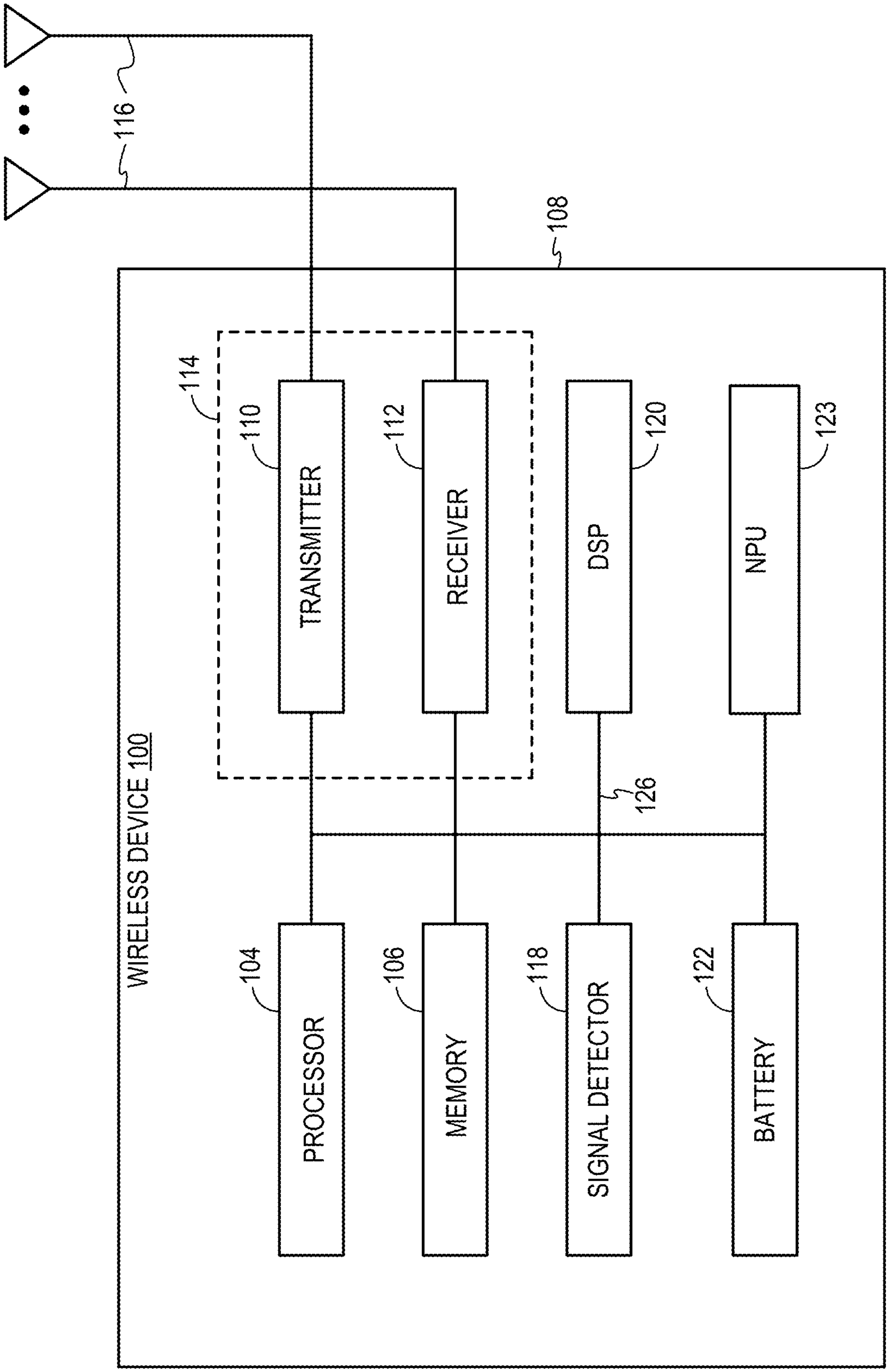
FIG. 1 illustrates a block diagram of an example device that includes a neural processing unit (NPU), in which aspects of the present disclosure may be practiced.

Certain aspects of the present disclosure are directed towards techniques for memory access. In some aspects, a data cache may be used to reduce the number of access attempts to memory, reducing power consumption. The data cache may be used to store data previously accessed from memory so that the data can be accessed from the cache later. Some aspects provide a next read index storage element that stores indices of data to be accessed from the data cache, allowing data to be stored in the cache multiple cycles before the data is retrieved from the cache for processing. Thus, data processing operations may be uninterrupted, as described in more detail herein. The data stored in the cache may be weight data for neural processing. The weight data may be multiplied with activation data to generate a feature map.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatuses, such as in the power supply, battery charging circuit, or power management circuit of a communication system, a video codec, audio equipment such as music players and microphones, a television, camera equipment, and test equipment such as an oscilloscope.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, an Internet of things (IoT) device, a wearable device, a virtual reality (VR) or augmented reality (AR) device, etc.

The device 100 may include a processor 104 that controls operation of the device 100. The processor 104 may also be referred to as a central processing unit (CPU). Memory 106 provides instructions and data to the processor 104. The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise coupled to the housing 108 and electrically connected to the transceiver 114.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122, which may be used to power the various components of the device 100 (e.g., when the device is disconnected from an external power source). The device 100 may also include a power supply system for managing the power from the battery (or from one or more power ports for receiving external power) to the various components of the device 100. At least a portion of the power supply system may be implemented in one or more power management integrated circuits (power management ICs or PMICs).

The device 100 may also include a neural processing unit (NPU) 123. The NPU may include a tightly-coupled memory (TCM) and circuitry for accessing the TCM for multiply and accumulate (MAC) operations. In some aspects of the present disclosure, the NPU may be implemented with a data cache, as described in more detail herein.

The various components of the device 100 may be coupled together by a bus system 126, which may include a power bus, a control signal bus, and/or a status signal bus in addition to a data bus. Additionally or alternatively, various combinations of the components of the device 100 may be coupled together by one or more other suitable techniques.

Example Memory Access Techniques

Convolution in machine learning (ML) applications involves applying a filter (e.g., weights data) to input data array (e.g., activation data) to create a feature map. The filter (weights data) is applied multiple times to the input data array. In neural processing units (NPUs) (e.g., also referred to as a neural signal processor (NSP)), weights and activation data may be stored in a tightly coupled memory (TCM) that may be software-controlled. Data read from the TCM is fed into matrix multipliers to perform multiply and accumulate (MAC) operations. In some cases, the same weight data may be used multiple times when performing the MAC operations. Therefore, the TCM may be accessed multiple times to read the same data, increasing power consumption. In certain aspects of the present disclosure, weight data may be stored in a cache and reused to decrease the number of access attempts to the TCM, reducing power consumption.

As ML applications get increasingly complex, the size of the TCM has been growing from generation to generation. Thus, an NPU may be implemented with a large TCM. TCM may be accessed to read weights and activation data using memory read control logic (also referred to as "TCM read control logic"). Activation data may be stored in an activation first-in-first-out (FIFO) storage element and weight data may be stored in a weight FIFO storage element. Data may be read from weight and activation FIFO storage elements and fed into an operations element (e.g., multipliers) for processing.

Figure 2:
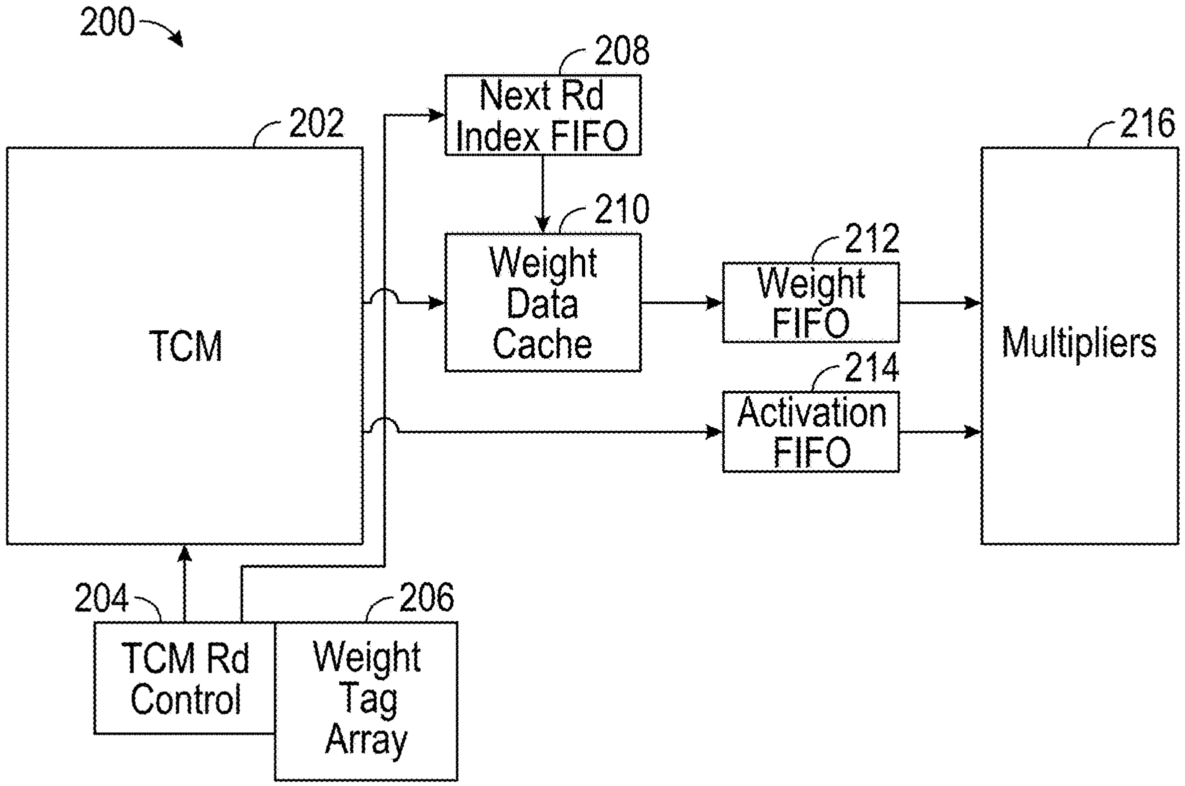
FIG. 2 is a block diagram of memory circuitry, in accordance with certain aspects of the present disclosure.

FIG. 2 is a block diagram of memory circuitry 200, in accordance with certain aspects of the present disclosure. The memory circuitry 200 may include a memory 202 (e.g., a TCM), a multiplier circuit 216 (e.g., including multipliers), a weight FIFO storage element 212, and an activation FIFO storage element 214. The multiplier circuit 216 (e.g., also referred to herein as an "operations element") may perform multiplications of the weight data in the weight FIFO storage element 212 and activation data stored in the activation FIFO storage element 214. Using a TCM read control logic 204, the weight data and activation data may be read from memory 202 and stored in the weight and activation FIFO storage elements before multiplication via the multiplier circuit 216.

In certain aspects of the present disclosure, the memory circuitry 200 also includes a weights data cache 210 used to cache TCM data read for weights. The memory circuitry 200 also includes a weights tag array 206 that keeps track of addresses of TCM data present in the weights data cache 210. Before fetching TCM data for filter weight, TCM read control logic 204 reads the weights tag array 206. Suppose the data line address for the data to be read from TCM is present in the weights tag array 206 (e.g., indicating the data to be read from the address in TCM is already stored in cache 210). In that case, the read control logic bypasses the TCM read and sends only control signals to indicate the index to read from the weights data cache 210. The index may be stored in a next read index FIFO storage element 208.

Suppose the data line address is not present in the weights tag array 206. In that case, the read control logic 204 may allocate a line in the weight data cache 210, read the data from memory 202, and send the data to be stored in the allocated line of the cache 210 along with the associated index for the line in cache 210. The index may be stored in the next read index FIFO storage element 208. The index may be used to write the line of data from memory 202 to the allocated line in the weights data cache 210. The allocation of a new line in the weight data cache 210 may be performed using any cache replacement policy, such as a least recently used (LRU) policy. In other words, if no line is available in the cache for new data, the line that has been least used (e.g., for a configured number of access attempts) may be overwritten. Indices are read from the next read index FIFO storage element 208 to read the associated data from the weight data cache 210 and write the data into the weights FIFO storage element 212. Data is read from the weight FIFO storage element 212 and activation FIFO storage element 214 and fed into the multiplier circuit 216.

Figure 3:
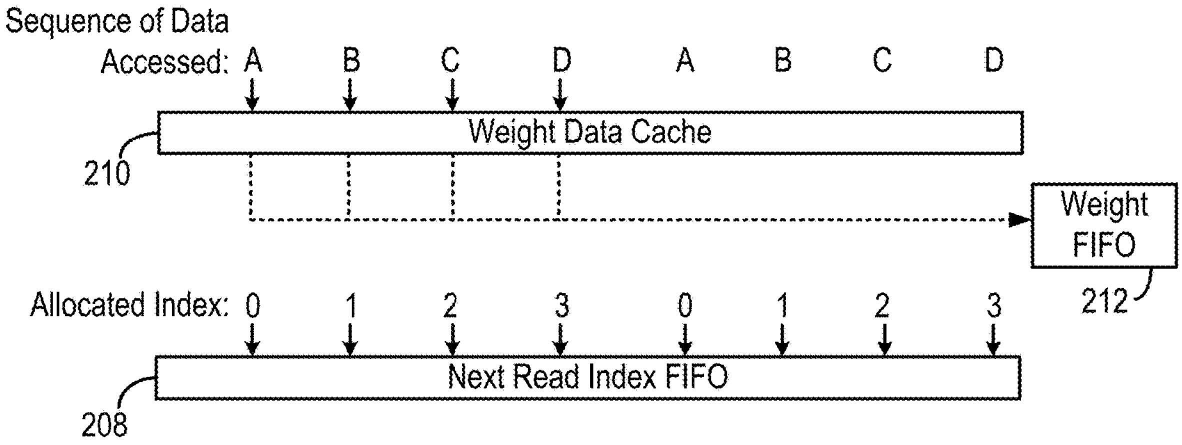
FIG. 3 illustrates an example sequence of data to be accessed and written to the weight first-in-first-out (FIFO) circuit, in accordance with certain aspects of the present disclosure.

FIG. 3 illustrates an example sequence of data to be accessed and written to the weight FIFO storage element 212, in accordance with certain aspects of the present disclosure. As shown, weight data labeled "A," "B," "C," and "D" may be accessed twice. The sequence of data to be accessed may be A, B, C, D, A, B, C, D, as shown. As described, the weight tag array 206 includes addresses associated with the data that have been stored in the weight data cache 210. Thus, the read control logic 204 may check the weight tag array 206 to determine whether the address in the memory 202 associated with the data A, B, C, D are in the weight tag array 206. If not, then the data A, B, C, and D are not included in the weight data cache 210.

When trying to access data A, the read control logic 204 checks the weight tag array 206 and determines that data A is not in the cache 210 (e.g., based on the address associated with data A in memory 202 not being in the weights tag array 206). Thus, the read control logic 204 may allocate a line in the weight data cache 210 for data A and store the associated index (e.g., data A may be allocated index 0) for the allocated line in the next read index FIFO storage element 208. The data A may then be read from memory 202 and stored in the allocated line in cache 210 based on the index in the next read index FIFO storage element 208. The same process may be performed for data B, C, and D allocated indexes 1, 2, and 3, respectively.

When data A is to be reused (e.g., reaccessed), the read control logic 204 may again check the weight tag array 206 and determine that data A is already stored in cache 210. Thus, as shown, the read control logic 204 may store, in the next read index FIFO storage element 208, the index 0 associated with the line in cache 210 at which data A is stored. The same process may be performed for data B, C, and D. In other words, instead of reaccessing the memory 202 for data A, B, C, and D, only the associated indices of the cache 210 are stored in the next read index FIFO storage element 208 so that the previously cached data A, B, C, D can be provided to the weight FIFO storage element 212.

The cache 210 may be read for processing many cycles after the tag array look-up occurs. In other words, by using the next read index FIFO storage element 208, the tag array look-up may occur many cycles before data is read from cache 210, allowing for uninterrupted operations. Without the next read FIFO storage element 208, if data to be accessed is not stored in cache, the operations (e.g., multiplier operations) may be disrupted until the data is accessed from memory 202 and stored in the cache. However, by using the next read FIFO storage element 208, the tag array look-up and storage of data in the cache 210 may occur many cycles before the data is transferred to the weight FIFO storage element 212 for processing. Therefore, even if some data is not stored in cache 210, there is time for the memory access and storage of the data in cache 210 to occur before the data transfer to the weight FIFO storage element 212, providing uninterrupted operations.

In certain aspects of the present disclosure, power may be saved that would otherwise be spent to access the memory array in the TCM and to transport data from the TCM to the weight FIFO storage element. Memory bandwidth may also be saved as the TCM may be accessed less frequently. The saved bandwidth can be used to access other data, such as activations, to help improve performance.

Applications that are bandwidth-bound by weight data may experience a performance improvement as only the index is provided to the next read index FIFO storage element instead of the entire line of data from the TCM to the weights FIFO storage element. For example, without the weight data cache 210, it may take four plus n cycles (e.g., n being a positive integer) to transmit one data line if the bandwidth from the TCM to the weights FIFO storage element 212 is a quarter of the data line per cycle. As an example, assume that the TCM line size is 128 bytes wide, but the interface between TCM and weight data cache 210 is 32 bytes. In this case, it would take four cycles/beats to transmit the line of data from the TCM to the weight cache as 32 bytes of data is accessed per cycle. The integer n may represent a minimum number of cycles to provide data from the read control logic 204 to the weight FIFO storage element. But with the weight data cache 210 and when the data line is present in the weight data cache 210, it only takes one plus n cycles to provide the index to the next read index FIFO storage clement 208, allowing for the data to be available in the weights FIFO storage element faster. The next read index FIFO storage element may be implemented with the same (or more) number of bits as the index (e.g., 10 bits) to store the entire index in the next read index FIFO storage element 208 in one cycle.

Figure 4:
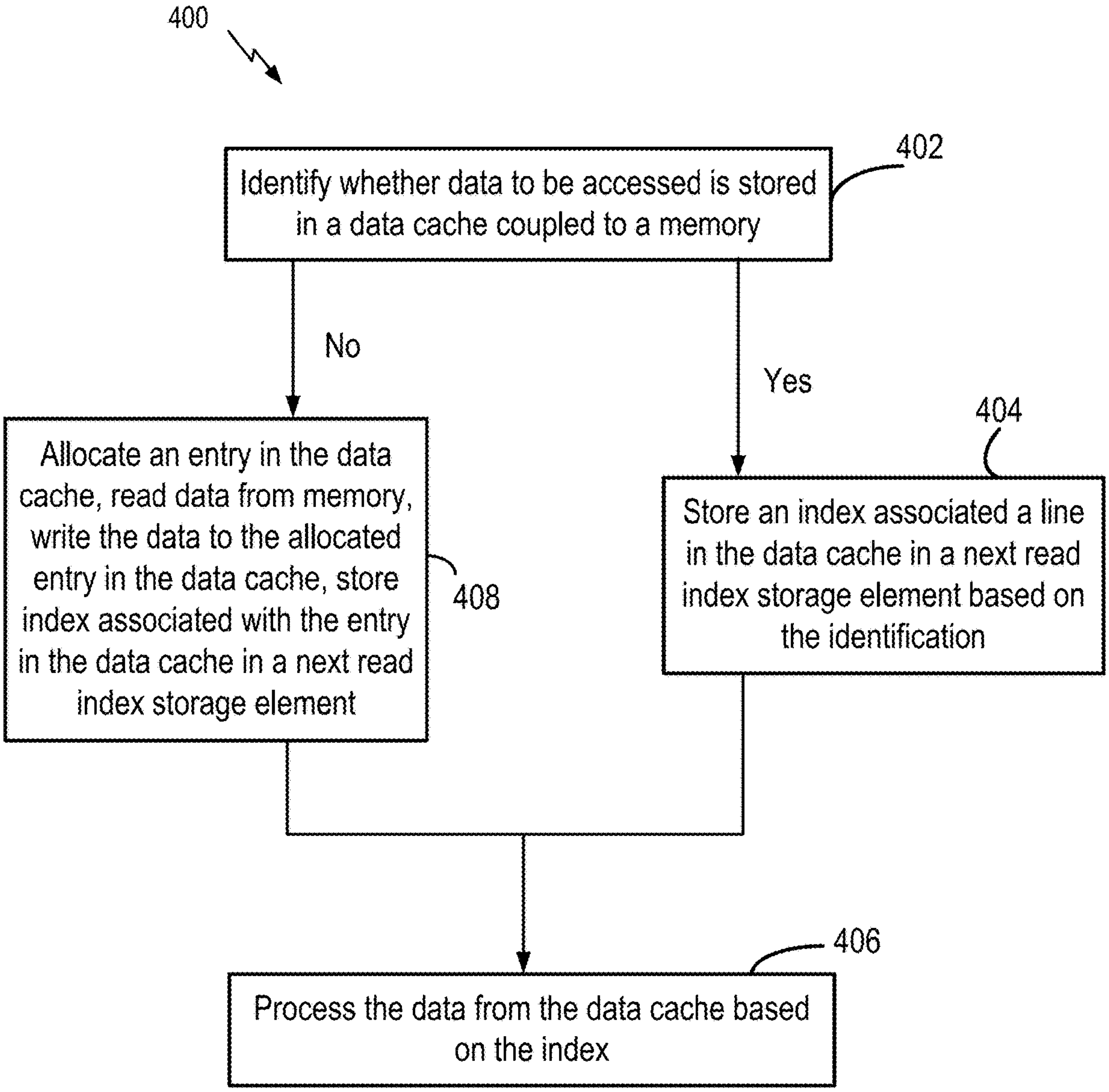
FIG. 4 is a flow diagram illustrating example operations for memory access, in accordance with certain aspects of the present disclosure.

FIG. 4 is a flow diagram illustrating example operations 400 for memory access, in accordance with certain aspects of the present disclosure. The operations 400 may be performed, for example, by memory circuitry such as memory circuitry 200 of FIG. 2.

At block 402, the memory circuitry may identify (e.g., via read control logic 204) whether data (e.g., weight data for a neural network) to be accessed is stored in a data cache (e.g., weight data cache 210) coupled to a memory (e.g., memory 202). In some aspects, identifying whether the data is stored in the data cache may include identifying that the data was previously stored in the data cache at the line in the data cache associated with the index. In some aspects, identifying whether the data to be accessed is stored in the data cache may include identifying whether an address associated with the data in the memory is in a tag array storage element (e.g., weights tag array 206).

At block 404, the memory circuitry stores an index associated with a line in the data cache in a next read index storage element (e.g., a FIFO storage element, such as the next read index FIFO storage element 208) based on the identification (e.g., based on the data being stored in the data cache). In some aspects, identifying whether the data is stored in the data cache may include identifying that the data is not stored in the data cache. In this case, the memory circuitry may allocate (e.g., via read control logic 204) the line in the data cache based on the data not being stored in the data cache, and transfer the data from the memory to the line in the data cache based on the identification.

At block 406, the memory circuitry reads and/or processes the data from the data cache based on the index. In some aspects, processing the data may include transferring the data from the data cache to a FIFO storage element (e.g., weight FIFO storage element 212) for processing and performing (e.g., via multiplier circuit 216) an operation on the data in the FIFO storage element. Performing the operation may include performing a multiplication operation. For example, the data may include weight data for a neural network. Processing the weight data may include multiplying the weight data with activation data. In some aspects, the index may be stored in the next read index storage element multiple cycles prior to the data being processed.

In some aspects, if the data is not stored in the data cache, at block 408, the memory circuitry allocate an entry (e.g., line) in the data cache, read the data from the memory, write the data to the allocated entry in the data cache, and store an index associated with the entry in the data cache in a next read index storage element. The memory circuitry may then, at block 406, process the data from the data cache based on the index.

Example Aspects

Aspect 1: A method for memory access, comprising: identifying whether data to be accessed is stored in a data cache coupled to a memory; storing an index associated with a line in the data cache in a next read index storage element based on the identification; and reading and/or processing the data from the data cache based on the index.

Aspect 2: The method of Aspect 1, wherein: identifying whether the data is stored in the data cache comprises identifying that the data is not stored in the data cache; allocating the line in the data cache based on the data not being stored in the data cache; and transferring the data from the memory to the line in the data cache based on the identification.

Aspect 3: The method of Aspect 1 or 2, wherein identifying whether the data is stored in the data cache comprises identifying that the data was previously stored in the data cache at the line in the data cache associated with the index.

Aspect 4: The method according to any of Aspects 1-3, wherein the next read index storage element comprises a first-in-first-out (FIFO) storage element.

Aspect 5: The method according to any of Aspects 1-4, wherein processing the data comprises: transferring the data from the data cache to a FIFO storage element for processing; and performing an operation on the data in the FIFO storage element.

Aspect 6: The method of Aspect 5, wherein performing the operation comprises performing a multiplication operation.

Aspect 7: The method according to any of Aspects 1-6, wherein identifying whether the data to be accessed is stored in the data cache comprises identifying whether an address associated with the data in the memory is in a tag array storage element.

Aspect 8: The method according to any of Aspects 1-7, wherein the data comprises weight data for a neural network.

Aspect 9: The method of Aspect 8, wherein processing the weight data comprises multiplying the weight data with activation data.

Aspect 10: The method according to any of Aspects 1-9, wherein the memory comprises a tightly-coupled memory (TCM).

Aspect 11: The method according to any of Aspects 1-10, wherein the index is stored in the next read index storage element multiple cycles prior to the data being read from the data cache and processed.

Aspect 12: An apparatus for memory access, comprising: a memory; a memory read controller configured to identify whether data to be accessed is stored in a data cache coupled to the memory; a next read index storage element configured to store an index associated with a line in the data cache in a next read index storage element based on the identification; and processing circuitry configured to process the data from the data cache based on the index.

Aspect 13: The apparatus of Aspect 12, wherein: to identify whether the data is stored in the data cache, the memory read controller is configured to identify that the data is not stored in the data cache; and the memory read controller is further configured to: allocate the line in the data cache based on the data not being stored in the data cache; and transfer the data from the memory to the line in the data cache based on the identification.

Aspect 14: The apparatus of Aspect 12 or 13, wherein, to identify whether the data is stored in the data cache, the memory read controller is configured to identify that the data was previously stored in the data cache at the line in the data cache associated with the index.

Aspect 15: The apparatus according to any of Aspects 12-14, wherein the next read index storage element comprises a first-in-first-out (FIFO) storage element.

Aspect 16: The apparatus according to any of Aspects 12-15, wherein: the processing circuitry comprises a FIFO storage element and an operations element to process the data; and the processing circuitry is configured to transfer the data from the data cache to the FIFO storage element for processing; and the operations element is configured to perform an operation on the data in the FIFO storage element.

Aspect 17: The apparatus of Aspect 16, wherein the operations element comprises a multiplier circuit.

Aspect 18: The apparatus according to any of Aspects 12-17, further comprises a tag array storage element, and wherein, to identify whether the data to be accessed is stored in the data cache, the memory read controller is configured to identify whether an address associated with the data in the memory is in the tag array storage element.

Aspect 19: The apparatus according to any of Aspects 12-18, wherein the data comprises weight data for a neural network.

Aspect 20: A neural processing unit, comprising: a memory; a memory read controller configured to identify whether weight data to be accessed is stored in a weight data cache coupled to the memory; a next read index first-in-first-out (FIFO) storage element configured to store an index associated with a line in the weight data cache in a next read index storage element based on the identification; and a multiplier circuit configured to multiply activation data and the weight data from the weight data cache based on the index.

Additional Considerations

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes and variations may be made in the arrangement, operation, and details of the methods and apparatus described above without departing from the scope of the claims.

What is claimed is:

1. A method for memory access, comprising:

identifying whether data to be accessed is stored in a data cache coupled to a memory;

storing an index associated with a line in the data cache in a next read index storage element based on the identification; and reading the data from the data cache based on the stored index.

2. The method of claim 1, wherein:

identifying whether the data is stored in the data cache comprises identifying that the data is not stored in the data cache;

allocating the line in the data cache based on the data not being stored in the data cache; and transferring the data from the memory to the line in the data cache based on the identification.

3. The method of claim 1, wherein identifying whether the data is stored in the data cache comprises identifying that the data was previously stored in the data cache at the line in the data cache associated with the index.

4. The method of claim 1, wherein the next read index storage element comprises a first-in-first-out (FIFO) storage element.

5. The method of claim 1, further comprising:

transferring the data from the data cache to a FIFO storage element for processing; and performing an operation on the data in the FIFO storage element.

6. The method of claim 5, wherein performing the operation comprises performing a multiplication operation.

7. The method of claim 1, wherein identifying whether the data to be accessed is stored in the data cache comprises identifying whether an address associated with the data in the memory is in a tag array storage element.

8. The method of claim 1, wherein the data comprises weight data for a neural network.

9. The method of claim 8, further comprising multiplying the weight data with activation data.

10. The method of claim 1, wherein the memory comprises a tightly-coupled memory (TCM).

11. The method of claim 1, wherein the index is stored in the next read index storage element multiple cycles prior to the data being read from the data cache and processed.

12. An apparatus for memory access, comprising:

a memory;

a memory read controller configured to identify whether data to be accessed is stored in a data cache coupled to the memory;

a next read index storage element configured to store an index associated with a line in the data cache in a next read index storage element based on the identification; and processing circuitry configured to process the data from the data cache based on the stored index.

13. The apparatus of claim 12, wherein:

to identify whether the data is stored in the data cache, the memory read controller is configured to identify that the data is not stored in the data cache; and the memory read controller is further configured to:

allocate the line in the data cache based on the data not being stored in the data cache; and transfer the data from the memory to the line in the data cache based on the identification.

14. The apparatus of claim 12, wherein, to identify whether the data is stored in the data cache, the memory read controller is configured to identify that the data was previously stored in the data cache at the line in the data cache associated with the index.

15. The apparatus of claim 12, wherein the next read index storage element comprises a first-in-first-out (FIFO) storage element.

16. The apparatus of claim 12, wherein:

the processing circuitry comprises a FIFO storage element and an operations element to process the data; and the processing circuitry is configured to transfer the data from the data cache to the FIFO storage element for processing; and the operations element is configured to perform an operation on the data in the FIFO storage element.

17. The apparatus of claim 16, wherein the operations element comprises a multiplier circuit.

18. The apparatus of claim 12, further comprises a tag array storage element, and wherein, to identify whether the data to be accessed is stored in the data cache, the memory read controller is configured to identify whether an address associated with the data in the memory is in the tag array storage element.

19. The apparatus of claim 12, wherein the data comprises weight data for a neural network.

20. A neural processing unit, comprising:

a memory;

a memory read controller configured to identify whether weight data to be accessed is stored in a weight data cache coupled to the memory;

a next read index first-in-first-out (FIFO) storage element configured to store an index associated with a line in the weight data cache in a next read index storage element based on the identification; and a multiplier circuit configured to multiply activation data and the weight data from the weight data cache based on the stored index.

* * * * *